United States Patent [19]
Moya

[11] 4,099,686
[45] Jul. 11, 1978

[54] RECEPTACLE FOR TAPE CARTRIDGE

[75] Inventor: Ephraim F. Moya, Canoga Park, Calif.

[73] Assignee: Instrumentation Technology Corp., Northridge, Calif.

[21] Appl. No.: 766,028

[22] Filed: Feb. 7, 1977

[51] Int. Cl.² .................. G03B 1/04; G11B 15/32; G11B 23/04
[52] U.S. Cl. ................................. 242/198; 360/137
[58] Field of Search ............... 242/55.19 A, 197–200; 360/93, 96, 137; 352/128, 72, 78

[56] References Cited
U.S. PATENT DOCUMENTS

| 3,864,050 | 2/1975 | Thomas | 403/329 |
| 3,955,216 | 5/1976 | Fujita | 360/137 |
| 3,994,577 | 11/1976 | Yamada et al. | 352/128 |

Primary Examiner—Leonard D. Christian

[57] ABSTRACT

A receptacle for a tape cartridge. The tape cartridge and the receptacle each has first and second axis orthogonally related locating faces which are pressed together in sets to hold the cartridge in the receptacle in accurate position on both axes. A freely rotatable and shiftable disc is shiftable in a slot and presses against the cartridge to hold the respective sets of locating faces against one another when the cartridge is in the receptacle.

12 Claims, 4 Drawing Figures

RECEPTACLE FOR TAPE CARTRIDGE

This invention relates to a receptacle for a tape cartridge.

Tape cartridges such as the Scotch DC 100A Data Cartridge made by Minnesota and Mining Manufacturing Co. are well-known in the art. They include a case which encloses the tape, leaving a portion exposed for reading by a head, and another portion exposed to be driven by a capstan. Obviously it is necessary for the tape to be accurately positioned relative to the capstan and to the head. These data cartridges have a first and a second axis locating face to which the position of the tape and of the drive means are related. It is an object of this invention to provide a simple and reliable means for receiving and holding the cartridge in a receptacle in proper alignment with the capstan and the drive means.

A receptacle according to this invention includes first and second axis locating faces which are fixed relative to a capstan drive and to a head. They are adapted to be pressed against by the respective first and second axis locating faces of the cartridge. The cartridge carries a surface which is pressed by bias means carried by the receptacle.

In the presently preferred embodiment of this invention, the bias means comprises a disc trapped between a pair of walls which is laterally shiftable toward and away from the cartridge, and biased toward and against a surface of the data cartridge such that the resultant force of the contact will press the respective locating faces toward and against one another, and tend to retain the cartridge in the receptacle.

The invention will be fully understood from the following detailed description and the accompanying drawings in which.

Figure 1:
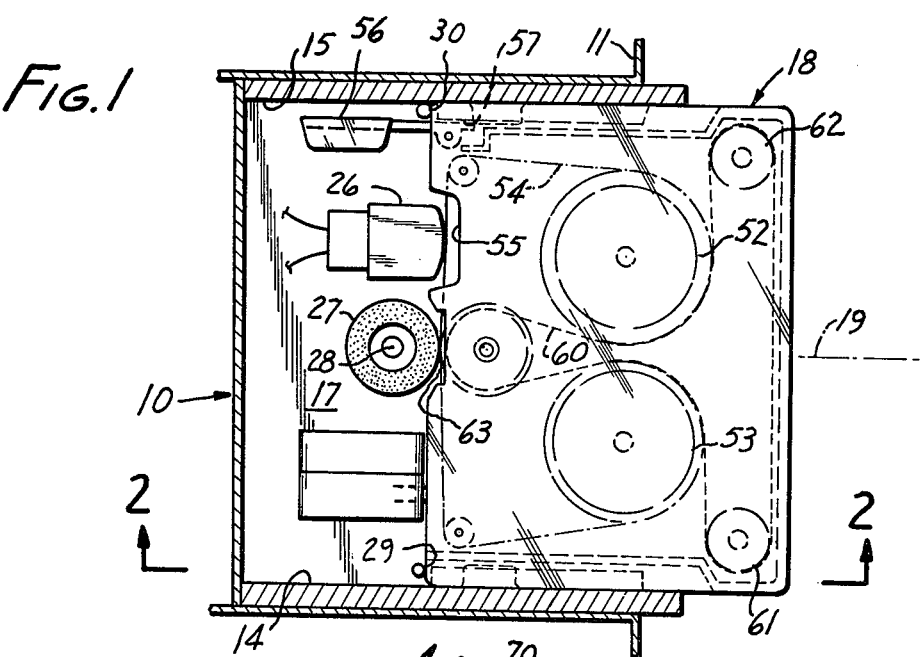
FIG. 1 is a cross-section taken at line 1—1 in FIG. 2.

FIG. 1 shows a receptacle 10 according to the invention fixed to a frame or chassis 11. The receptacle includes a top wall 12, a bottom wall 13, and a pair of side walls 14, 15. The walls form a rectangular array having an opening 16. A cavity 17 is formed inside the walls to receive a tape cartridge 18 which is inserted through the opening.

The receptacle has a first axis 19 in the direction of insertion and removal of the cartridge, and a second axis 20 which is normal to the plane of the cartridge and also normal to the first axis. Generally speaking the first axis is parallel to all of the walls, and the second axis is perpendicular to the top and bottom walls.

Figure 4:
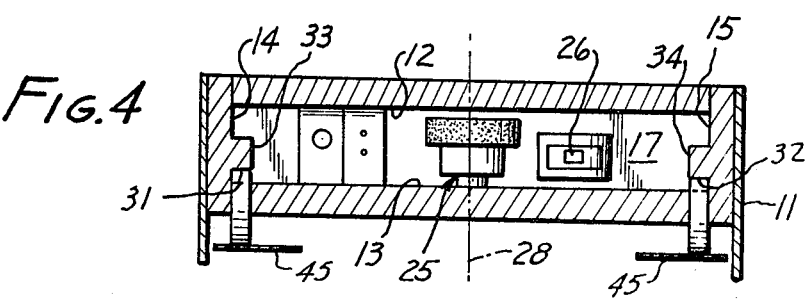
FIG. 4 is a cross-section taken at line 4—4 of FIG. 2.

Within the receptacle there is a capstan 25 and a magnetic head 26 in accordance with conventional constructions. The capstan includes a soft rubber wheel 27 which rotates around an axis 28 which is parallel to the second axis 20. Head 26 is adjacent to it. The first axis locating faces 29, 30 are formed as pins projecting upwardly into the cavity from bottom wall 13. Second axis locating faces 31, 32 (FIG. 4) are formed on side rails 33, 34 attached to side walls 14, 15 respectively. These locating faces are on the bottom of the rails. The rails include a tapered lead-in section 35.

Bias means 40 comprises a rotatable circular flat-walled disc 41 which closely but slidably fits between walls 42, 43 of a slot 44 in the bottom wall. The spacing apart of walls 42, 43 i.e., the width of slot 44, is about equal to the diameter of the disc. It is just enough larger to permit the disc to move up and down, and rotate, in the slot. The disc can therefore shift up and down in the slot in the direction of the second axis, but cannot shift in the direction of the first axis by a distance greater than the tolerance necessary to enable the disc to move in the slot. A blade spring 45 biases the disc upwardly without interfering appreciably with its freedom of rotation.

Tape cartridge 18 comprises top and bottom plates 50, 51 which sandwich a pair of tape reels 52, 53 between them. The magnetic recording tape 54 on the reels passes from one reel to the other, passing a first aperture 55 where the tape is exposed to the head. A pivotal closure 56 is pivotally mounted between the plates and is tripped open by a trip member 57 in the receptacle. This is a known cartridge construction.

A drive strip 60 is wrapped around a pair of idler wheels 61, 62 and a pressure wheel 63. It bears against the outside of the tape on each of the reels so that rotation of the pressure wheel causes the drive strip to move and rotate the reels and move the tape past the aperture. Again this is a known construction.

The capstan bears against the drive strip, which is backed by the pressure wheel. The pressure wheel is sometimes called "drive means". It is necessary to be certain that the capstan wheel engages the drive strip at the pressure wheel, and that the tape is properly located relative to the head.

In this invention advantage is taken of the fact that portions of bottom plate 51 are themselves accurately located relative to the locations where the capstan and the head are intended to be operative. The bottom plate is usually metallic and carries a first axis locating face 65. The edge of the plate adjacent to the exposed surfaces of the tape constitutes face 65. Portions of this face 65 are adapted to abut locating faces 29 and 30. The thickness of the bottom plate is known, so that either its top or its bottom surface can be used for locating purposes. In this embodiment the top surface of the bottom plate constitutes second axis locating faces 66 and 67. These are the portions which respectively contact the second axis locating faces 31 and 32. The lead-in section guides the plate to correct alignment.

Figure 2:
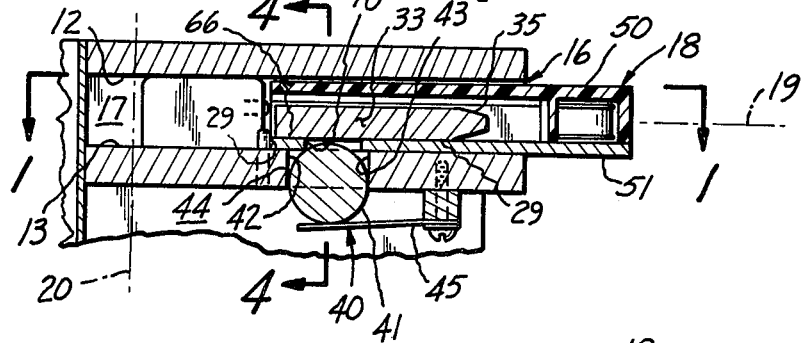
FIG. 2 is a cross-section taken at line 2—2 in FIG. 1.
Figure 3:
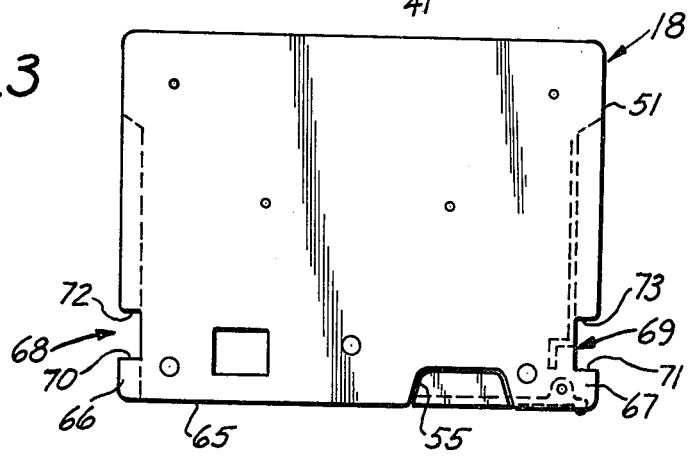
FIG. 3 is a bottom view of a cartridge to be held in the receptacle.

When the cartridge is fully inserted, the sets of first and second axis locating faces are in abutment. Now they must be kept in abutment. For this purpose, use is made of a pair of notches 68, 69 at each edge of the bottom plate. More particularly, the notches have leading edges 70, 71 and trailing edges 72, 73, respectively. As can best be seen in FIG. 2, the bias means when pushed up will bear against the respective leading edge, but will clear the trailing edge. Accordingly, there is a resultant force on the bottom plate tending to press the cartridge inwardly and upwardly so that the first locating faces abut and the second locating faces abut. The cartridge is thereby resiliently biased and held in position. To remove it, the cartridge is pulled to the right in FIG. 2. It overcomes the bias means, causing the leading edge to depress the disc. The plate then simply rolls the disc as it passes over the disc, and the cartridge can be removed. The first axis locating faces are located such that when the cartridge is in its proper inserted position, the pressure wheel will slightly indent the capstan with the drive strip firmly held between them. Pressure wheel 63 is relatively hard. Wheel 27 is relatively soft.

The details of operation of the capstan and of the head are not given, because they are completely conventional and form no part of this invention. Suffice it to say that a drive motor and responsive circuitry are provided.

This invention thereby provides an elegantly simple rugged and reliable means for receiving and holding a cartridge in an accurately aligned position.

This invention is not to be limited by the embodiment shown in the drawings and described in the description which is given by way of example and not of limitation, but only in accordance with the scope of the appended claims.

I claim:

1. A receptacle for receiving a tape cartridge including tape-bearing reels and a pressure wheel for driving the tape, and a first and second axis locating face, said receptacle comprising: a first and a second side wall in part bounding a cavity, said cavity having a first axis extending in the direction of insertion and removal of the cartridge from the receptacle, and a second axis normal to the first axis and also normal to the plane of the cartridge, a second axis locating face carried by each of said side walls, and a first axis locating face carried by the receptacle, whereby the cartridge may be pressed into the cavity and the sets of first and second axis locating faces brought into abutment with one another accurately to align the tape, and bias means exerting forces along both of said axes, whereby to press both the first and second axis locating faces together in sets.

2. A receptacle according to claim 1 in which said bias means is a single body which exerts its bias effect to produce components of force along both the first and second axis.

3. A receptacle according to claim 1 in which the bias means includes a surface which is at an angle to both of said axes, and which is engageable with an edge of a notch in the cartridge to exert a component of bias force along both the first and the second axis.

4. A receptacle according to claim 1 in which the bias means comprises a disc, and a slot in a wall of the receptacle opening into the cavity limiting the movement of the disc along said first axis but permitting movement along said second axis, and spring means forcing the disc toward the cavity, the periphery of the disc in the cavity forming a sloping surface relative to both axes, and so disposed and arranged as to bear against the edge of a notch in the cartridge to exert a component of bias force along both of said axes.

5. A receptacle according to claim 4 in which the disc is rotatable in said notch, and in which the spring means is a blade bearing against the disc and holding it in the slot.

6. A receptacle according to claim 1 in which a rail is disposed on each of said side walls, and in which a respective second axis locating face is disposed on each of said rails to be engaged by a respective second axis locating face on the cartridge.

7. A receptacle according to claim 6 in which a tapered lead in surface on each rail leads to the respective second axis locating face.

8. A receptacle according to claim 6 in which the receptacle includes a top and a bottom wall, said first axis locating faces of the receptacle being fixed to one of said top or bottom walls.

9. A receptacle according to claim 6 in which said bias means comprises a single body which exerts its bias effect to produce components of force along both the first and second axis.

10. A receptacle according to claim 6 in which the bias means includes a surface which is at an angle to both of said axes, and which is engageable with an edge of a notch in the cartridge to exert a component of bias force along both the first and the second axis.

11. A receptacle according to claim 6 in which the bias means comprises a disc, and a slot in a wall of the receptacle opening into the cavity limiting the movement of the disc along said first axis but permitting movement along said second axis, and spring means forcing the disc toward the cavity, the periphery of the disc in the cavity forming a sloping surface relative to both axes, and so disposed and arranged as to bear against the edge of a notch in the cartridge to exert a component of bias force along both of said axes.

12. A receptacle according to claim 11 in which the disc is rotatable in said notch, and in which the spring means is a blade bearing against the disc and holding it in the slot.

* * * * *